United States Patent [19]

Daguet et al.

[11] Patent Number: 5,560,882

[45] Date of Patent: Oct. 1, 1996

[54] METHOD OF OVERMOLDING AN UNDERWATER CABLE EQUIPMENT

[75] Inventors: Bruno Daguet, Calais, France; Martin Ganz, Zurich-Oerlikon, Switzerland; Jean-Francois Libert, Condette, France

[73] Assignees: Alcatel Cable, Clichy Cedex, France; Intron Engineering AG, Zurich-Oerlikon, Switzerland

[21] Appl. No.: 388,472

[22] Filed: Feb. 14, 1995

Related U.S. Application Data

[62] Division of Ser. No. 102,844, Aug. 6, 1993, Pat. No. 5,407,340.

[30] Foreign Application Priority Data

Aug. 7, 1992 [FR] France .................. 92 09835

[51] Int. Cl.⁶ .................. B29C 45/14; B29C 45/27
[52] U.S. Cl. .................. 264/265; 264/40.1; 264/271.1; 264/275; 264/279
[58] Field of Search .................. 264/254, 271.1, 264/276, 265, 266, 275, 279, 250, 40.1, 255, 272.11; 425/116, 120, 129.1, 570, 533, 112, 547, 552, 544; 249/95

[56] References Cited

U.S. PATENT DOCUMENTS 2,471,683  5/1949  Halbach .
2,890,615  6/1959  Lefebvre .
3,671,159  6/1972  Greenberg et al. .................. 425/573
3,970,488  7/1976  Nelson .................. 249/95
4,204,896  5/1980  Richardson .................. 249/95
4,235,832  11/1980  Leighton .................. 264/276
4,405,083  9/1983  Charlebois et al. .................. 264/275
4,422,841  12/1983  Alfonsi et al. .
4,461,736  7/1984  Takagi .................. 264/271.1
4,664,612  5/1987  Storch .
4,678,866  7/1987  Charlebois .
4,701,117  10/1987  Takaoka et al. .................. 425/116
4,767,589  8/1988  Takaoka et al. .................. 264/271.1

FOREIGN PATENT DOCUMENTS 980000  5/1951  France .

OTHER PUBLICATIONS

Japanese Patent Abstrat 57–199620 dated Dec. 7, 1982.

*Primary Examiner*—Jan H. Silbaugh
*Assistant Examiner*—Angela Ortiz
*Attorney, Agent, or Firm*—Sughrue, Mion, Zinn, Macpeak & Seas

[57] ABSTRACT

A machine for overmolding an equipment of an underwater cable includes a heated mold. The mold has a fixed half-mold with two side injection molding inlets and a mobile half-mold on a machine frame. These are coupled to a high-pressure injection molding press through an overmolding material distribution chamber and to the ends of the mold cavity. The machine finds an application in overmolding joint boxes and repeater housings.

3 Claims, 4 Drawing Sheets

METHOD OF OVERMOLDING AN UNDERWATER CABLE EQUIPMENT

This is a divisional of application Ser. No. 08/102,844, filed Aug. 6, 1993, now U.S. Pat. No. 5,407,340.

BACKGROUND OF THE INVENTION

1. Field of the Invention

The present invention concerns overmolding joint boxes and repeater housings during the laying or repair of underwater cables. It applies in particular to a machine for overmolding such equipments of an underwater cable, the method of using it and equipments overmolded using the machine.

2. Description of the Prior Art

An underwater cable comprises the line cables, repeaters in housings equipped with access cables (tail cables) and joint boxes in which two line cables are connected together or a line cable is connected to a repeater access cable. Each joint box and each repeater housing is cylindrical with a conical portion at each end. The joint boxes and repeater housings are covered with a polyethylene jacket sealing and electrically insulating the cable from the surrounding seawater and continuous with the jacket of the line and access cables.

The jacket is overmolded onto the boxes and housings. The techniques used until now carry out the overmolding operation separately by first overmolding the central cylindrical part and subsequently overmolding the conical end parts, achieving continuity on either side of these end portions with the jacket of the line or access cable concerned and with the central overmolding applied previously. For each of these operations the overmolding is performed by injecting the required volume of polyethylene slowly and at a low pressure into the cavity of a mold.

These overmolding operations take a long time. They give rise to four interface areas between the central overmolding, the two end overmoldings and the polyethylene jackets of the line and/or access cables concerned. The protection can be improved at these interface areas by means of heat-shrink sleeves threaded over the cables and the central overmolding and slid into place after the end overmoldings are done.

An object of the present invention is to reduce significantly the overall duration of overmolding each equipment of an underwater cable, to reduce thereby the cost of overmolding carried out in the factory or on the cable laying ship, and to reduce the number of interface areas produced and consequently the risks of defects in these interface areas.

SUMMARY OF THE INVENTION

In one aspect the invention consists in a machine for overmolding an underwater cable equipment which is cylindrical in shape with conical end parts at each end through which two connecting cables pass axially, said machine comprising:

a mold comprising an upper half-mold and a lower half-mold, one fixed to a machine frame and the other mobile and adapted to be actuated between an open position and a closed position of said mold, receiving in the cavity defined between them said equipment and adjoining portions on either side thereof of said two cables, a press for injecting the overmolding material under pressure having an injector outlet coupled to the cavity of said mold via said fixed half-mold, a longitudinal distribution chamber coupling said injector outlet and two side injector inlets in said fixed half-mold, and means for controlled heating and cooling of said mold, in which machine said half-molds have semi-annular side passages forming two annular passages in the closed mold disposed between said side inlets and the ends of said mold cavity and each having an external opening by which it communicates with the respective side inlet and an internal opening by which it communicates with the respective end of the cavity.

The machine further has at least one of the following additional features:

A slot provides communication between each annular side channel and the respective end of the cavity, this slot being advantageously continuous and of varying width to render uniform the injection of material into the end of the cavity.

The mold has a central annular passage at the periphery of the cavity and open to the exterior of the mold by way of a slot at its center.

The mold comprises along the cavity cooling passages and heating elements integrated into the half-molds and includes auxiliary forced convection heating means which are adapted to melt the jackets of the cables housed in the ends of the mold.

In another aspect the invention consists in a method of using the machine as defined above comprising the following successive steps:

heating said mold to a temperature of approximately 130° C., placing said equipment in said heated lower half-mold in the mold's open position, heating the portions of said cables near said conical end parts of said equipment until the jacket on said cable portions is substantially melted, closing said mold and locking said half-molds together, filling said injection molding press with a substantially excess quantity relative to the overmolding to be formed of plasticized and homogenized polyethylene and injecting it into said chamber, said annular side passages and said cavity at a high pressure of approximately 200 bars, and cooling and then opening said mold.

In a further aspect the invention consists in an equipment covered with an overmolding applied by a machine as defined above wherein said overmolding is continuous from one of said cables to the other and has two side beads on the outside of the cables, one on each side of the conical ends of said equipment covered with said overmolding, and a central bead on the outside of said overmolding, said beads being removable.

The features and advantages of the present invention will emerge from the following description of a preferred embodiment of the invention shown in the appended drawings.

DETAILED DESCRIPTION OF THE INVENTION

The overmolding machine as shown and described hereinafter produces a polyethylene overmolding over the length of a joint box for two line cables of an underwater cable and simultaneously joins the overmolding to the adjacent portions of the two cables on either side, the cables having a polyethylene jacket and being connected together in the joint box. The machine carries out this overmolding in one operation. A similar machine but with a different mold is used to overmold a repeater housing equipped with its two access cables connected to the circuits of the repeater in the box, the overmolding extending to either side of the box and being joined directly to the jackets of the access cables.

Figure 1:
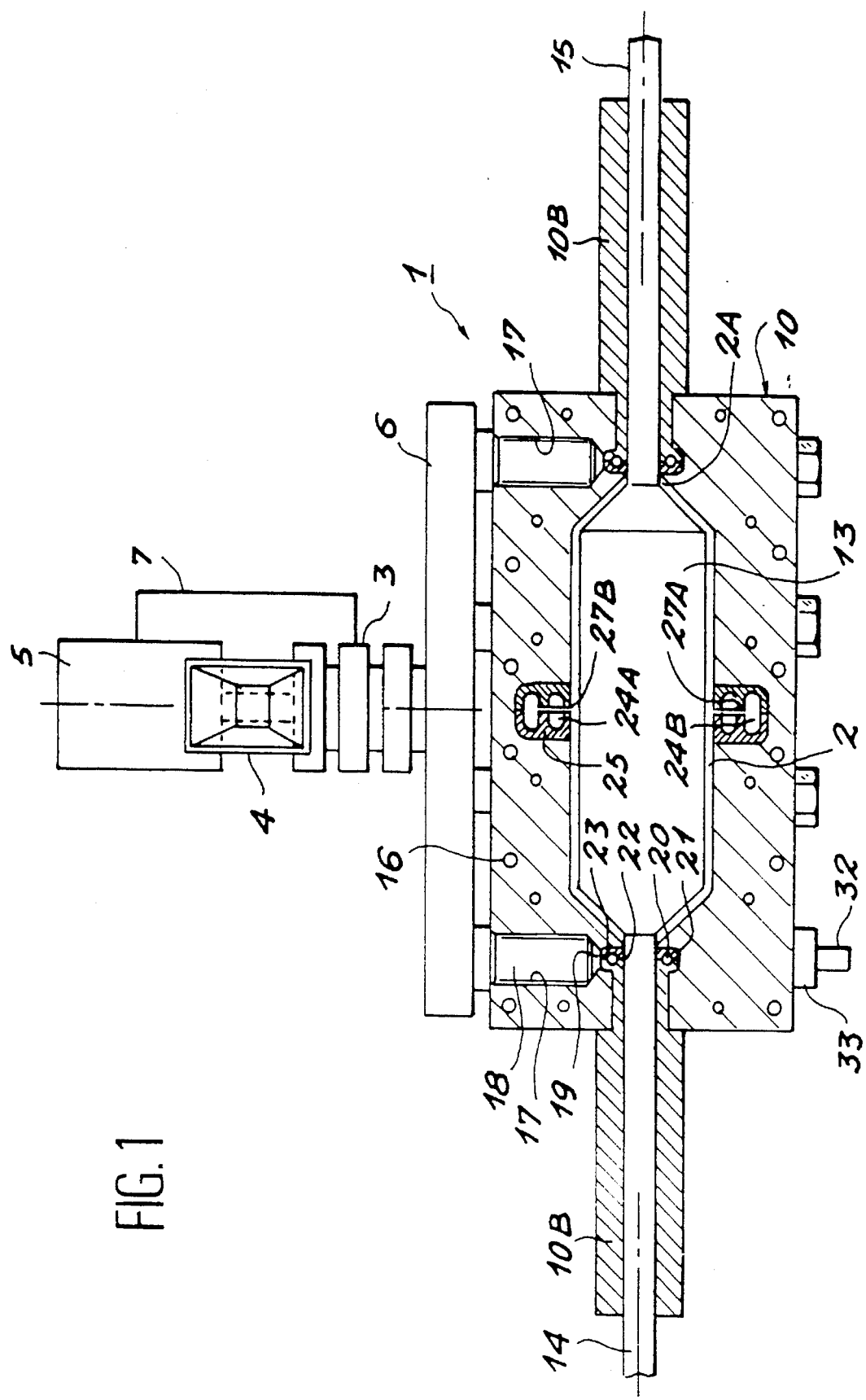
FIG. 1 is a partial side view in cross-section of an overmolding machine in accordance with the present invention.

Referring to FIG. 1, the machine comprises a steel mold 1 whose internal cavity 2 is appropriate to the overmolding to be formed, a device 3 for injecting polyethylene at raised temperature and at a high pressure in the order of 200 bars into the mold cavity 2, a feed hopper 4 containing granulated polyethylene and feeding the injector device, a device such as a hydraulic ram 5 for actuating the injector device, a heated longitudinal polyethylene distribution chamber 6 coupled to the outlet of the device 3 and to the mold 1, and a main control unit 7 connected to the various devices and elements equipping the mold, the control unit initiating and controlling the operation of each device and element.

Figure 2:
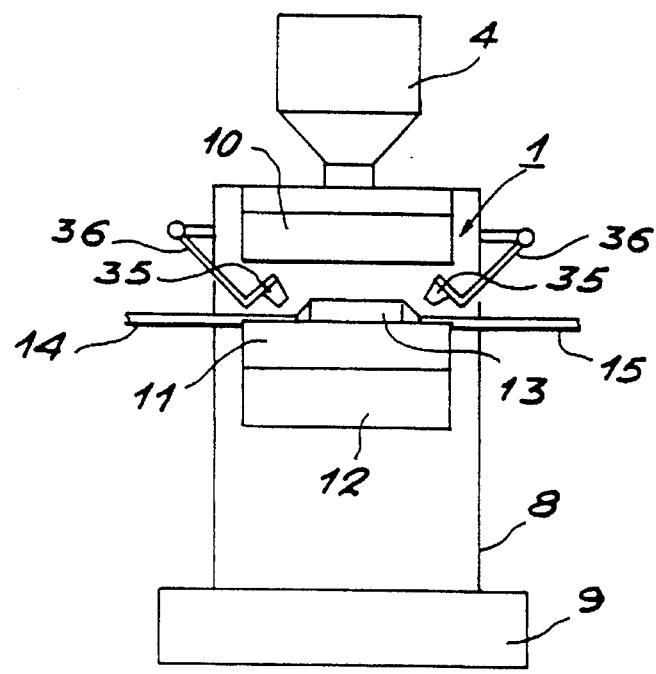
FIG. 2 is a front view of the machine showing the mold open.
Figure 3:
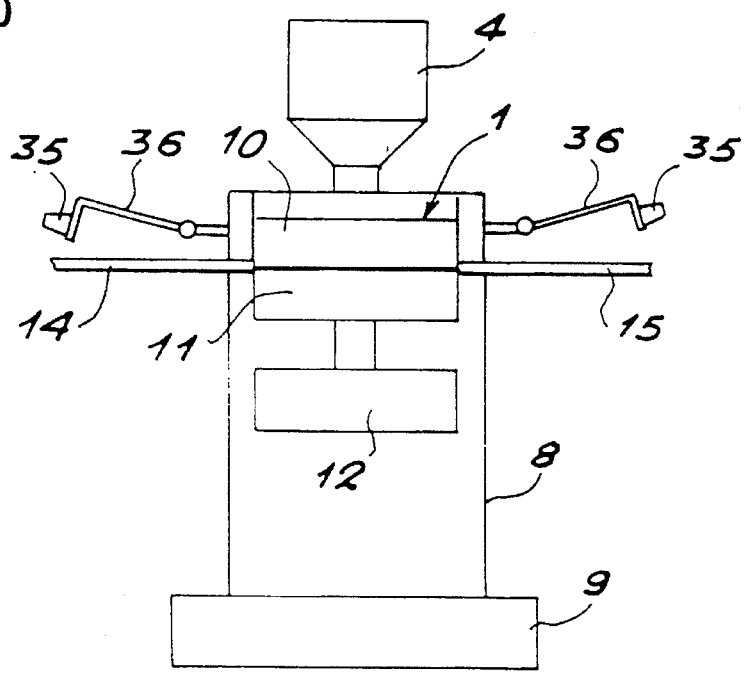
FIG. 3 is a view analogous to FIG. 2 showing the mold closed.
Figure 4:
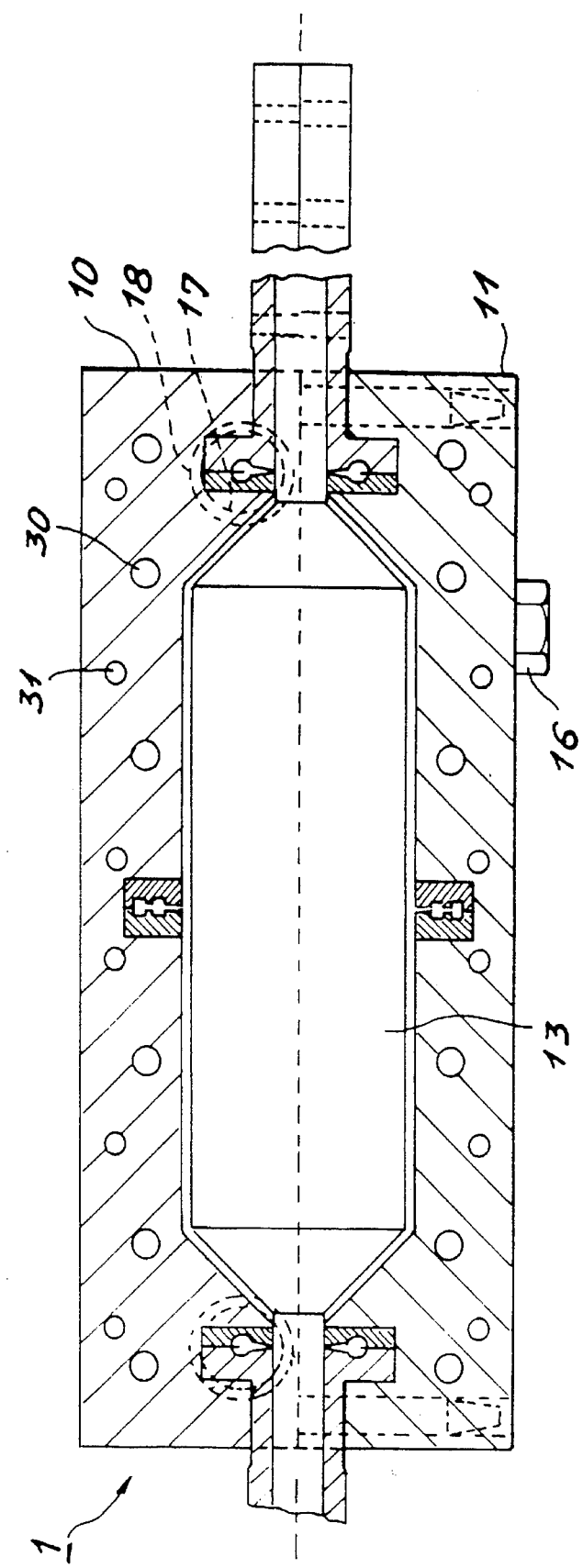
FIG. 4 is a view of the mold of the machine in vertical cross-section.

Referring also to FIGS. 2 and 3, the machine is mounted on a frame 8 resting on a plinth 9 on the ground. The mold 1 is at the front of the frame. It comprises two half-molds, an upper half-mold 10 fixed to the frame and coupled to the distribution chamber 6 and a lower half-mold 11 which is mobile on the frame and faces the upper half-mold. The lower half-mold is actuated by its own actuator device 12, which is another hydraulic ram, for example, between a lowered mold open position (FIG. 2) and a raised mold closed position (FIG. 3). In the lowered open position it enables the joint box 13 and the adjoining portions on either side thereof of the two cables 14 and 15 already connected together in the joint box to be placed in the lower half-mold. In the raised closed position the joint box 13 and the adjoining cable portions are enclosed in the mold and the two half-molds are then locked together by a set of screws 16 received in vertical housings that each comprises on either side of the cavity. FIG. 4 shows the two half-molds locked together in this way.

The upper half-mold is described in more detail hereinafter with reference to FIG. 1, in which it is shown on its own, and/or FIGS. 4 through 6.

The upper half-mold 10 has two rear side inlets 17 in the end portions of its rear part. These inlets 17 are connected directly to two outlets 18 of the distribution chamber 6 which end at an injector nozzle 19 and are locked in these side inlets.

The upper half-mold 10 comprises a main part 10A incorporating said side inlets 17 and two end parts 10B whose ends are removably nested within those of the main part. The two end parts 10B project from the ends of the main part. As an alternative to this, this half-mold may be in one part.

The two end parts 10B incorporate a semi-cylindrical longitudinal groove matching the half-diameter of the jacketed cable which each receives without clearance. They hold the cables and the joint box in the mold cavity 2 leaving around the box the gap necessary to form the overmolding. Their ends within the main part 10A are received in corresponding grooves which extend the cavity axially. They extend virtually, but not totally, to the two ends of the joint box. They define the ends 2A of the cavity 2 facing which are the side inlets 17.

Two circular cross-section internal injector passages 20 are provided in the nested end of each of the parts 10B of the upper half-mold 10 around the quasi-immediate periphery of the portion of each cable near the joint box.

These semi-annular injector side passages are each defined by a groove in the front surface of the nested end of each end part 10B and by a half-shell member 21 grooved in exactly the same way and fitted against this front surface. These side injector passages discharge through a continuous or non-continuous slot 22 into the end 2A of the cavity. They have a peripheral opening 23 through which each communicates with the side inlet 17 and thus with one of the outlets 18 of the chamber 6.

A double material outlet passage 24A, 24B is provided inside the upper half-mold, at its center and around the nearby outside of the central portion of the joint box. The two discharge channels 24A and 24B are semi-annular and superposed so that pressurized material flows first into one and then into the other. As shown in FIG. 6, they are defined by two domes 25 grooved in exactly the same way in face to face relationship and accommodated in a corresponding groove at the periphery of the cavity 2, at its centre. They communicate with each other through a slot 27A and with the cavity through a slot 27B.

The upper half-mold 10 also comprises (FIG. 10) heating elements 30 embedded in it, lengthwise of the cavity, and horizontal cooling passages 31 passing through it from the rear towards the front, lengthwise of the cavity. The cooling passages are connected to front and rear pipes 32 for supplying and evacuating a cooling fluid such as water equipped with individual valves 33. The heating elements 30 and valves 33 are controlled by the main control unit 7.

The mobile lower half-mold 11 is equipped with the same members as those described hereinabove in respect of the upper half-mold, except for the side inlets 17 and the peripheral opening 23 of each annular injection side passage 20, which are provided on the fixed upper half-mold. The lower half-mold will thus not be described separately.

Further specific provisions in the machine and more particularly in or at the mold are described hereinafter with reference to the relevant figures.

One of these provisions is shown diagrammatically in FIGS. 2 and 3. It consists in providing auxiliary heating means for the jackets of the two cable portions adjoining the joint box in the form of two side convection heating heads 35 mounted on telescopic arms 36 fixed to the frame 8 of the machine.

The two heads are shown at the front of the mold 1 so that they can be seen in the figures, but they could equally well be at the rear of the mold. The heads and their position are controlled by the main control unit. They are positioned near the cable portions near the joint box and heat and quickly melt the jacket of these portions when the bottom half-mold is still in the lowered open position. They are retracted and inactive afterwards. These, preferably pulsed hot air convection heating means may be implemented differently and directly associated with the mold to implement this function by using selectively openable passages for feeding pulsed air into the lower half-mold 11 and/or the upper half-mold 10.

Figure 5:
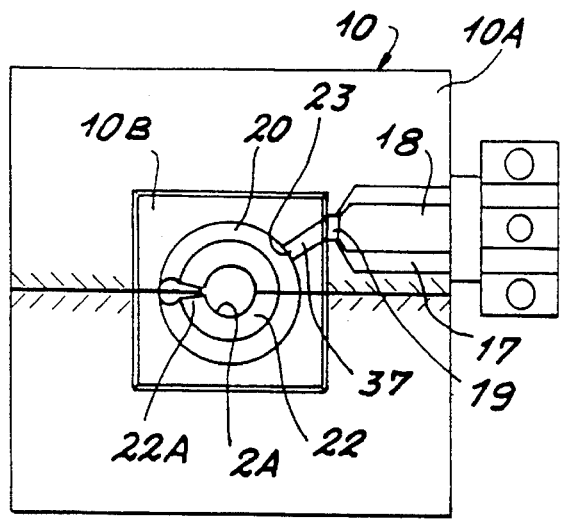
FIG. 5 is a view in horizontal cross-section and to a scale slightly greater than that of FIG. 1 of an assembly for injecting material into the mold cavity.
Figure 6:
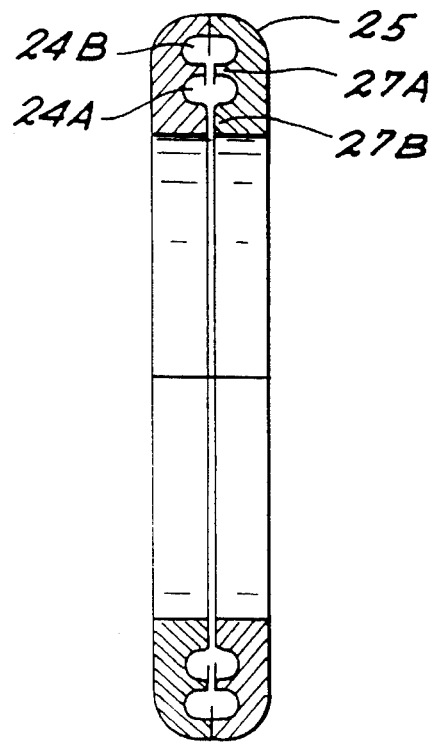
FIG. 6 is a view of a mold outlet portion in horizontal cross-section.

Other additional specific provisions shown in FIG. 5 relate to the injection of material into the annular injector passages 20 and from the latter into the ends 2A of the mold cavity. They consist in two inclined passages 37 in the upper half-mold 10, each extending between an upper end at each end nozzle 19 at the outlet 18 of the chamber 6 and a lower end at the peripheral opening 23 of each annular passage 20 and in the slots 22 through which the annular passages 20 communicate with the ends of the cavity, which are not of the same width along the periphery of each end of the cavity. The width is less at the facing parts and on either side of the peripheral opening 23 into which the inclined passage 37 discharges and is maximum (although still relatively small) in the part 22A substantially opposite the peripheral opening 23. This is to render uniform the injection of material over all the periphery of each end 2A of the cavity.

The injection molding press system and its actuator device are of a type well known in the plastics material industry. For this reason it is not shown in the overmolding machine and is not described in detail. Suffice to say that it uses a rotary screw mobile in translation to plasticize the granules of polyethylene placed in the hopper and then heated, melted and homogenized for injection of the stored required quantity of polyethylene under pressure into the distribution chamber and from there into the mold, the injection pressure being maintained as the mold cools.

Figure 7:
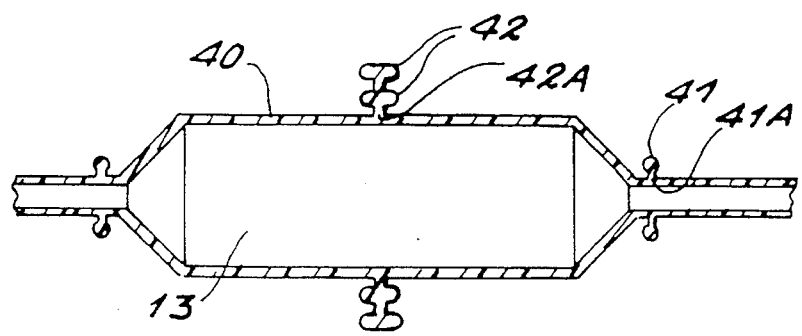
FIG. 7 shows an equipment overmolded using the machine.

FIG. 7 shows the joint box 13 with its overmolding 14 applied by the machine. On removal from the machine the overmolding comprises an annular bead 41 at each end of the overmolded joint box and an annular bead 42 in its central peripheral area. These correspond to the two annular injection passages and the double annular outlet passage of the machine. The beads 41 and 42 are linked to the overmolding 40 by thin continuous webs 41A, 42A and are easily removed by cutting them off, the cut areas being then buffed up.

The operation of the machine is explained hereinafter. It is organized into a series of possibly overlapping sequences which are started and stopped by the main control unit. These sequences are as follows:

In a preparatory sequence, carried out in otherwise dead time, the open mold is heated to a temperature of around 130° C., after which the box is placed in the open mold which is maintained at this temperature.

In a first operating sequence the portion of the polyethylene jacket of each cable near the box is heated until it melts. This takes about eight minutes, after which the mold is closed.

In a second sequence the injection molding press is filled with slightly more than the required quantity of polyethylene which is plasticized and homogenized before it is injected at high pressure into the mold cavity from each end. The polythene injected into the two ends of the mold by rotation of the press injector screw then fills the mold, welds together at the center and is discharged under pressure into the double outlet passage. It takes about one minute to fill the mold. The heat input to the mold is then cut off but the injection pressure is maintained by the actuator ram applying thrust to the injector screw.

In a third sequence the mold is cooled, starting from the central area and from there towards the ends, by forced circulation of water in its individual cooling passages and the exterior pipes, whose valves are opened in succession. This sequence lasts about ten minutes. The injection pressure is maintained for the first half of this sequence or thereabouts.

The mold is then opened to remove the overmolded joint box. The overall duration of the overmolding operation starting with the first sequence is in the order of 25 minutes, including the times needed to mount the shells and domes in the half-molds to define the annular injection and outlet passages and to lock the two half-molds together. Overmolding of the entire box is carried out in a single operation. It requires only a relatively low mold temperature. By way of comparison, prior art techniques for overmolding only the ends of the joint box require in the order of three hours.

With reference to the three main sequences mentioned above, note that the first sequence may incorporate an auxiliary sequence of draining the press, the distribution chamber and the mold passages, in particular after the machine has not been used for some considerable time. This draining sequence is carried out after heating the mold and before placing the joint box in it. It enables the polyethylene remaining in the chamber and in some passages of the mold from the last overmolding operation to be collected and eliminated.

Note further that the outlet passage makes it possible to collect in the central bead of the overmolding of the box any surface soiling of the box so that it can be eliminated from the final overmolding. This is because this central bead is formed by the polyethylene which has flowed over the box into the outlet passage. It is eliminated subsequently.

The machine has been described with reference to the embodiment shown by way of example. Modifications can obviously be made to the machine without departing from the scope of the invention. In particular the mold passages depend on whether the two half-molds are in a single piece or several pieces. The means for heating the mold and the cable jackets and for cooling the mold may also be implemented and fitted differently provided that they are equivalent to the means described. There may be a single central outlet passage, rather than a double passage, the latter enabling the overall volume to be increased whilst retaining the discharge of material into it under pressure. The end parts of the half molds may also be cooled by providing two longitudinal passages in each of them.

There is claimed:

1. A method of overmolding an underwater cable equipment which is cylindrical in shape, which has a longitudinal axis, and which has at longitudinally opposite ends thereof conical end parts through which two connecting cables pass axially, said method being implemented by a machine comprising:

mold comprising an upper half-mold and a lower half-mold which define between them a cavity for receiving said equipment, and which have, adjacent said conical end parts, adjoining projecting portions for receiving said two connecting cables, one half-mold being fixed to a machine frame, and the other half-mold being movable and adapted to be actuated between an open position and a closed position of said mold, said cavity being cylindrical in shape and having conical end portions at opposite ends thereof, a press for injecting an overmolding material under pressure into said cavity while the equipment and the two connecting cables are disposed in said cavity, said press having an injector outlet coupled to the cavity of said mold via said fixed half-mold, a longitudinal distribution chamber coupling said injector outlet to two side injector inlets in said fixed half-mold, and means for controlled heating and cooling of said mold, wherein said half-molds have semi-annular side passages which form, in the closed mold, two annular side passages disposed between said side injector inlets and opposite ends of said mold cavity, each annular side passage having an external opening, by which it communicates with a respective side injector inlet, and an internal opening by which it communicates with a respective end of the cavity; and wherein said heating and cooling means comprise heating elements integrated into said half-molds lengthwise of said cavity, cooling passages provided lengthwise of said cavity and coupled to external cooling fluid feed and evacuation pipes equipped with selectively operable valves, and auxiliary heating means facing said ends of said cavity, said method comprising the following successive steps:

heating said mold to a temperature of approximately 130° C., placing said equipment in said heated lower half-mold in the mold's open position, heating portions of said cables near said conical end parts of said equipment until a jacket on said cable portions is substantially melted, closing said mold and locking said half-molds together, filling said injection molding press with a substantially excess quantity, relative to the overmolding to be formed, of plasticized and homogenized polyethylene and injecting it into said chamber, said annular side passages and said cavity at a high pressure of approximately 200 bars, and cooling and then opening said mold.

2. The method according to claim 1 wherein only a central part of said mold is cooled initially, and parts to either side of said central part are cooled thereafter.

3. The method according to claim 1, wherein the successive steps are carried out in sequences started and controlled in duration by a main control unit.

\* \* \* \* \*